United States Patent
Wells et al.

(10) Patent No.: US 7,613,264 B2
(45) Date of Patent: Nov. 3, 2009

(54) FLEXIBLE SAMPLING-RATE ENCODER

(75) Inventors: Paul J. Wells, Fremont, CA (US);
Baptiste Paquier, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 680 days.

(21) Appl. No.: 11/190,035

(22) Filed: Jul. 26, 2005

(65) Prior Publication Data

US 2007/0025482 A1 Feb. 1, 2007

(51) Int. Cl.
*H04L 7/00* (2006.01)
(52) U.S. Cl. .................. 375/355; 375/219; 375/293; 375/354; 375/360; 375/367; 455/423; 455/85; 704/200; 704/205; 704/500
(58) Field of Classification Search ......... 375/135–136, 375/146–147, 215, 219, 224–227, 252, 354, 375/355, 365–367, 293, 359, 360, 369; 380/205; 714/738; 455/423, 550, 552, 575
See application file for complete search history.

(56) References Cited

U.S. PATENT DOCUMENTS

| | | | | |
|---|---|---|---|---|
| 5,901,178 A | * | 5/1999 | Lee et al. ................... | 375/240 |
| 6,223,053 B1 | * | 4/2001 | Friedmann et al. ........ | 455/552.1 |
| 2004/0017853 A1 | * | 1/2004 | Garrido et al. ......... | 375/240.16 |
| 2004/0080671 A1 | * | 4/2004 | Siemens et al. ............. | 348/473 |
| 2004/0247121 A1 | * | 12/2004 | Lee et al. .................... | 380/205 |
| 2006/0107154 A1 | * | 5/2006 | Bansal et al. ............... | 714/738 |
| 2006/0177018 A1 | * | 8/2006 | Kobayashi et al. ....... | 379/88.07 |

* cited by examiner

*Primary Examiner*—Shuwang Liu
*Assistant Examiner*—Hirdepal Singh
(74) *Attorney, Agent, or Firm*—Christopher P. Maiorana, PC

(57) ABSTRACT

A method for implementing a flexible sampling-rate encoder, comprising the steps of (A) sampling an input signal at a regular time-interval to produce sampled data, (B) generating a pseudo-random bit sequence having a plurality of bits, wherein each bit corresponds to a different sampling time, (C) encoding a first set of the sampled data to generate an encoded stream when any bit in the pseudo-random bit sequence is equal to a first value, wherein each bit in the encoded stream corresponds to one of the sampling times defined in step (B), and (D) determining the different sampling time for each sample in the encoded stream.

15 Claims, 4 Drawing Sheets

ENCODER

ENCODER

DECODER

ENCODING

DECODER

US 7,613,264 B2

FLEXIBLE SAMPLING-RATE ENCODER

FIELD OF THE INVENTION

The present invention relates to digital video processing generally and, more particularly, to a method and/or apparatus for implementing a flexible sampling-rate encoder.

BACKGROUND OF THE INVENTION

Conventional encoders encode samples with a fixed sampling interval in time. Data compression is often used due to the limited capacity of storage medium and/or the limited bandwidth of transmission medium. High data compression is usually lossy and often involves the transformation of the data into a different representation (such as the frequency domain). Such compression allocates the transmission or storage bits according to a subjective model. Audio encoders generally store higher frequencies with a lower bit-resolution than lower frequencies. Such subjective models have one or more of the following disadvantages (i) the encoding is computationally expensive, (ii) the models are prescriptive and forces the implementation of the decoding to follow a particular scheme that does not encourage the improvement of decoding technologies, and (iii) the encoding is block based which frequently causes artifacts such as pre-echo.

SUMMARY OF THE INVENTION

The present invention concerns a method for implementing a flexible sampling-rate encoder, comprising the steps of (A) sampling an input signal at a regular time-interval to produce sampled data, (B) generating a pseudo-random bit sequence having a plurality of bits, wherein each bit corresponds to a different sampling time, (C) encoding a first set of the sampled data to generate an encoded stream when any bit in the pseudo-random bit sequence is equal to a first value, wherein each bit in the encoded stream corresponds to one of the sampling times defined in step (B), and (D) determining the different sampling times for each sample in the encoded stream.

The objects, features and advantages of the present invention include providing a method and/or apparatus that may (i) reduce artifacts such as pre-echo when encoders are implemented as block-based and/or (ii) enable the implementation of decoding to follow a number of schemes which encourages the improvement of decoding technologies.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
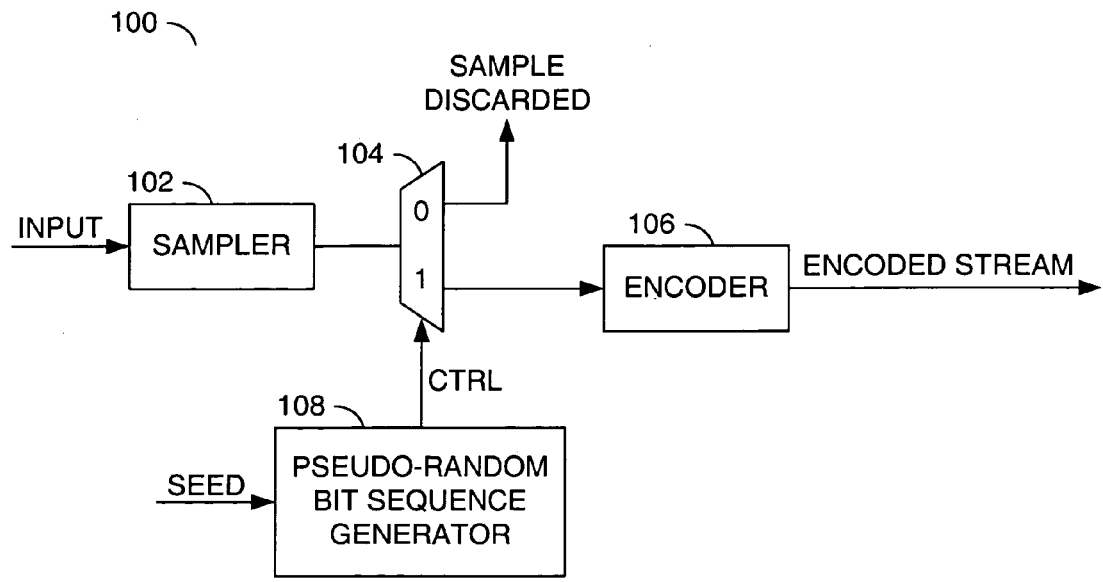
FIG. 1 is a block diagram of an encoder according to the present invention.

Referring to FIG. 1, a block diagram of an encoder system 100 is shown. The present invention is generally illustrated for a one-dimensional case (e.g., audio), but the present invention may be readily extended to two dimensional data (e.g., images) and three dimensional data (e.g., video). The system 100 generally comprises a block (or circuit) 102, a block (or circuit) 104, a block (or circuit) 106, and a block (or circuit) 108. The circuit 102 may be implemented as a sampler circuit. The circuit 104 may be implemented as a multiplexer circuit. The circuit 106 may be implemented as an encoder circuit. The circuit 108 may be implemented as a pseudo-random bit sequence generator. The sampler circuit 102 normally receives a signal (e.g., INPUT) and may present a signal to the multiplexer 104. The multiplexer 104 either presents an output 0, representing discarded samples, or presents an output 1, representing samples that are processed. The multiplexer 104 may receive a control signal (e.g., CTRL) from the generator circuit 108. The generator circuit 108 presents the signal CTRL in response to a signal (e.g., SEED). The output of the multiplexer 104 may be presented to the encoder 106. The encoder 106 presents a signal (e.g., ENCODED_STREAM).

In one example, the signal INPUT may comprise a data set of audio samples S(j) sampled at a regular time-interval with the sampler circuit 102. The pseudo-random bit sequence generator 108 may construct a deterministic pseudo-random bit sequence (PRBS) P(j) (e.g., the signal CTRL). The signal CTRL may include a value 1 for a fraction K of the samples. The signal CTRL may include a value 0 for a remaining fraction (1−K) of the samples. The fraction K may be adjusted in response to a complexity of the signal INPUT. Such a pseudo-random sequence may (a) allow the times of the decoded samples to be reconstructed without wasting storage and/or bandwidth and (b) avoid artifacts from periodic charges in sampling density.

For each sample S(j), if P(j)=1, then the circuit 100 accepts the corresponding sample S(j). If P(j)=0, then the circuit 100 rejects the corresponding sample S(j). For each accepted sample of S(j) and each rejected sample of S(j) a new sequence may be produced with a fraction K of the original samples. The signal ENCODED_STREAM generally comprises the new sequence of accepted samples produced with the fraction K of the original samples. In the simplest case, the PRBS is fixed so samples are selected randomly but with a fixed "average" frequency. The sampling rate may be varied by changing the properties of the PRBS. In a particularly complex part of the audio, there may be many "1s" generated by the PRBS. In a simple part of the audio, there may be many "0s". This change in the PRBS is normally communicated between the encoder and decoder.

Figure 2:
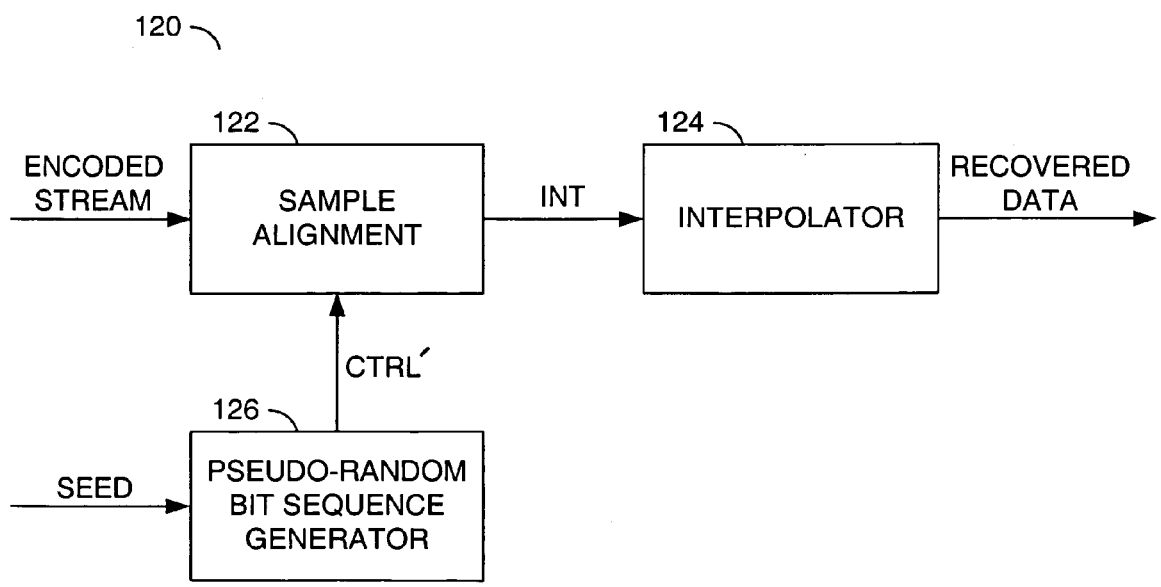
FIG. 2 is a block diagram of a decoder.

Referring to FIG. 2, a system 120 is shown that generates a signal (e.g., RECOVERED_DATA) in response to the signal ENCODED_STREAM. The system 120 generally comprises a block (or circuit) 122, a block (or circuit) 124 and a block (or circuit) 126. The circuit 122 may be implemented as a sample alignment circuit. The circuit 124 may be implemented as an interpolator circuit. The circuit 126 may be implemented as a pseudo-random bit sequence generator. The circuit 126 may be implemented similarly to the circuit 108 of FIG. 1. For example, the circuit 126 may generate a control signal (e.g., CTRL') in response to the signal SEED. The signal SEED is presented to both the sequence generator 108 and the sequence generator 126. The sequence generator 108 and the sequence generator 126 produce a similar PRBS. The circuit 122 may present a signal (e.g., INT) to the circuit 124 in response to the signal ENCODED_STREAM and the signal CTRL'. The circuit 124 may generate the signal RECOVERED_DATA in response to the signal INT.

In general, the generator 126 may determine the timing of the data samples of the signal ENCODED_STREAM since the same PRBS is provided by the sequence generator 108 and the sequence generator 126. The sample alignment circuit 122 aligns corresponding bits from the PRBS to the bits or data samples on the signal ENCODED_STREAM. After alignment, the signal INT includes data samples encoded on the signal ENCODED_STREAM. The signal INT also includes don't care values which correspond to missing data discarded during the encoding process. The interpolator 124 interpolates the don't care data samples to produce the data samples originally in the signal INPUT. The interpolation process of the decoder 120 may be implemented in a variety of ways, such as with a linear predictive coding and/or neural networks. Because a number of the data samples are close together, the decoder 170 may effectively recover high-frequency information. In one example, the data sample spacing may range between 1:2 and 1:4. However, other spacing may be used to meet the design criteria of a particular implementation. If conventional uniform sampling was implemented, recovery of high frequency information may not be possible.

Figure 3:
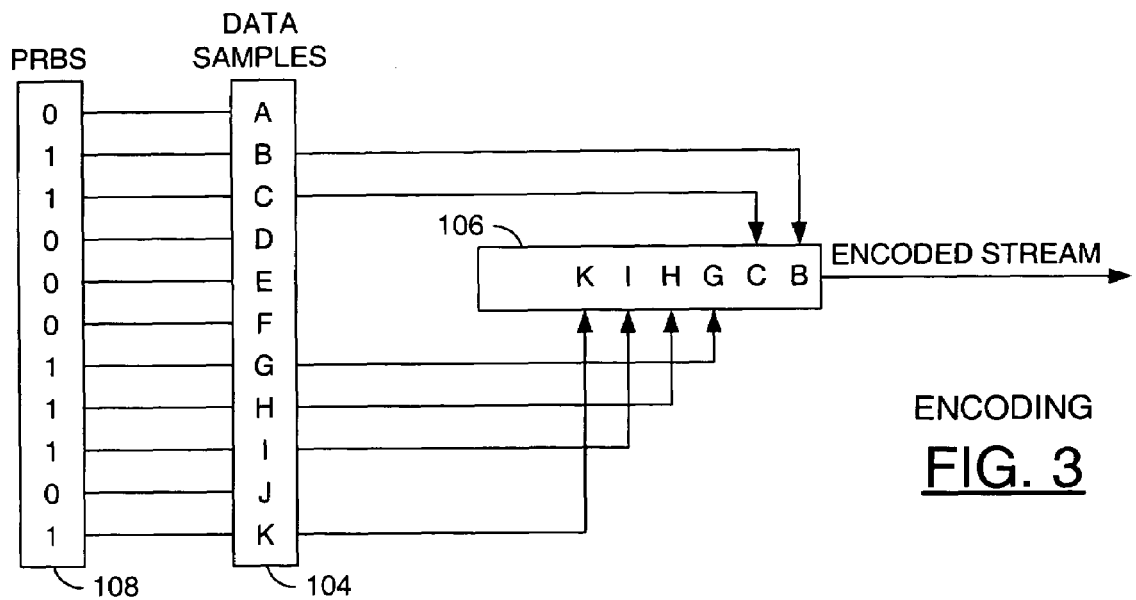
FIG. 3 is a block diagram of another embodiment of an encoder.

Referring to FIG. 3, an example of the operation of the encoding of the present invention is shown. The sequence generator 108, the multiplexer 104 and the encoder 106 are shown in an alpha/numeric representation. The sequence generator may store an array of binary data. The data sample circuit 108 generally stores an array of data samples S(j). For every bit in the array of binary data in the sequence generator 108 which is equal to one, the corresponding data in data samples (j) may be presented to the encoder 106. The encoder 106 generates the signal ENCODED_STREAM.

Figure 4:
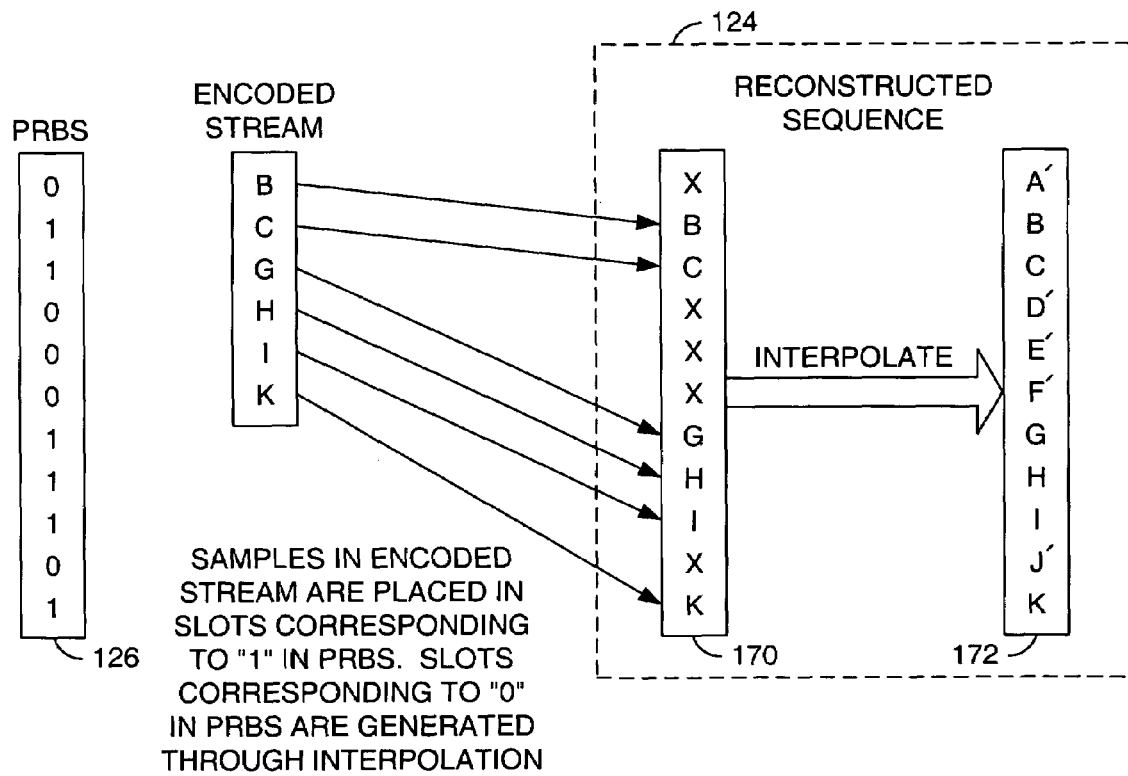
FIG. 4 is a diagram illustrating a reconstructed sequence in accordance with the present invention.

Referring to FIG. 4, an example of reconstructed sequence of the decoder 120 is shown. The interpolator circuit 124 generally comprises a block (or circuit) 170 and a block (or circuit) 172. The circuit 170 may be implemented as an array (or an out-buffer). The circuit 172 may be implemented as an array. The interpolator circuit 124 may include a counter (not shown). The counter will be discussed in more detail in connection with FIG. 6. The contents of the array 170 and the array 172 illustrate one sample in time of the PRBS. The interpolator circuit 124 generally stores the data samples of the signal ENCODED_STREAM in an in-buffer (not shown) before the data samples are sent to the array 170. The data samples in the array 170 are generally positioned corresponding to the position of binary ones in the sequence generator 126. In general, "don't care" values (shown with an "X") are placed in the array 170 which correspond to position of the zeros in the generator circuit 126. After interpolation, the missing data samples may be reconstructed and stored in the array 172. The reconstructed data samples stored and positioned in the array 172 correspond to the position of zeros in the sequence generator 108.

In one example, a kernel based method may be implemented to interpolate the data samples of the signal ENCODED_STREAM. The kernel based method takes the encoded data samples S(i) at a time i, and interpolates the unknown samples R(j) as follows:

$$R(j) = \Sigma\, S(i) f(j-i)$$

In general, a kernel function may be used (to be described in more detail in connection with FIG. 6) that decreases with an increasing absolute size of f(j−i). The summation is typically over the most recent N samples of encoded data samples S(i) where the interpolated samples are at times within the time-range of the recently captured N samples.

Figure 5:
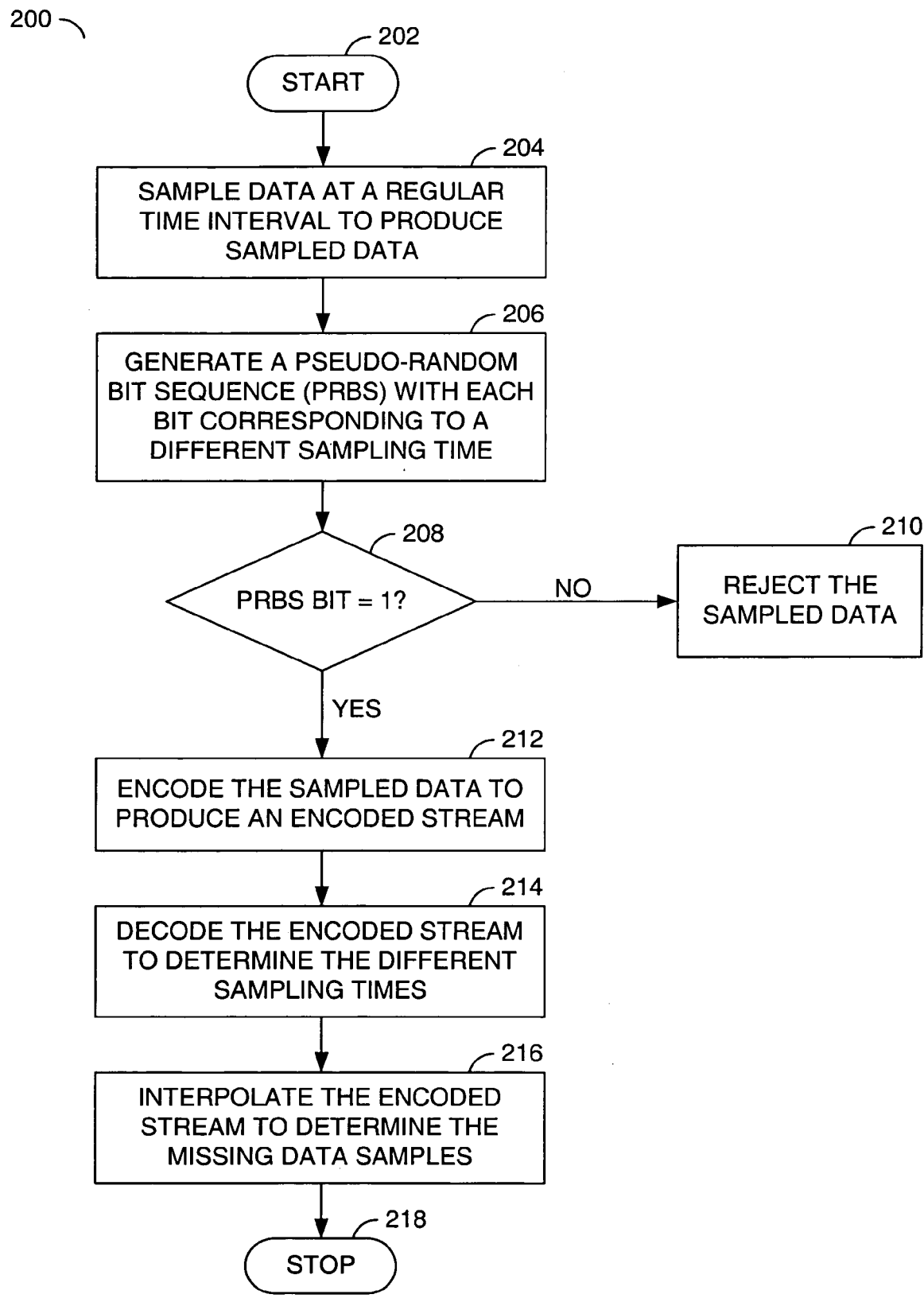
FIG. 5 is a flow diagram illustrating a method of implementing the present invention.

Referring to FIG. 5, a method 200 illustrating the present invention is shown. The method 200 generally comprises a state (or step) 202, a state (or step) 204, a state (or step) 206, a decision state 208, a state (or step) 210, a state (or step) 212, a state (or step) 214, a state (or step) 216, and a state (or step) 218. The state 202 generally comprises a start state. The state 204 generally comprises sampling data at a regular time-interval to produce sampled data. The state 206 generally comprises generating a PRBS, where each bit in the PRBS corresponds to a different sampling time. The decision state 208 generally comprises determining whether any bits in the PRBS are equal to a first value (e.g., the first value may be defined as any bit in the PRBS that is equal to one). The method 200 moves from the decision state 208 to the state 212 when the value of the bit in the PRBS is equal to one. The state 212 generally comprises encoding the sampled data to produce the signal ENCODED_STREAM. In general, the sampled data which corresponds to bits in the PRBS which are equal to one may be inserted into the signal ENCODED_STREAM. The state 210 generally comprises rejecting the sampled data for any values in the PRBS which are not equal to the first value.

The state 214 generally comprises decoding the signal ENCODED_STREAM to determine the different sampling times of the sampled data. The state 214 uses the PRBS to determine the sample times of the sampled data on the signal ENCODED_STREAM. The same PRBS generated in the state 206 may also be presented to the decoder 120 to decode the data on the signal ENCODED_STREAM. The state 216 generally comprises interpolating the rejected or the missing sampled data from the signal ENCODED_STREAM. The state 216 recovers the missing or rejected data samples to provide the signal RECOVERED_DATA. The signal RECOVERED_DATA comprises a copy of the original data set of audio samples presented by the signal INPUT.

Figure 6:
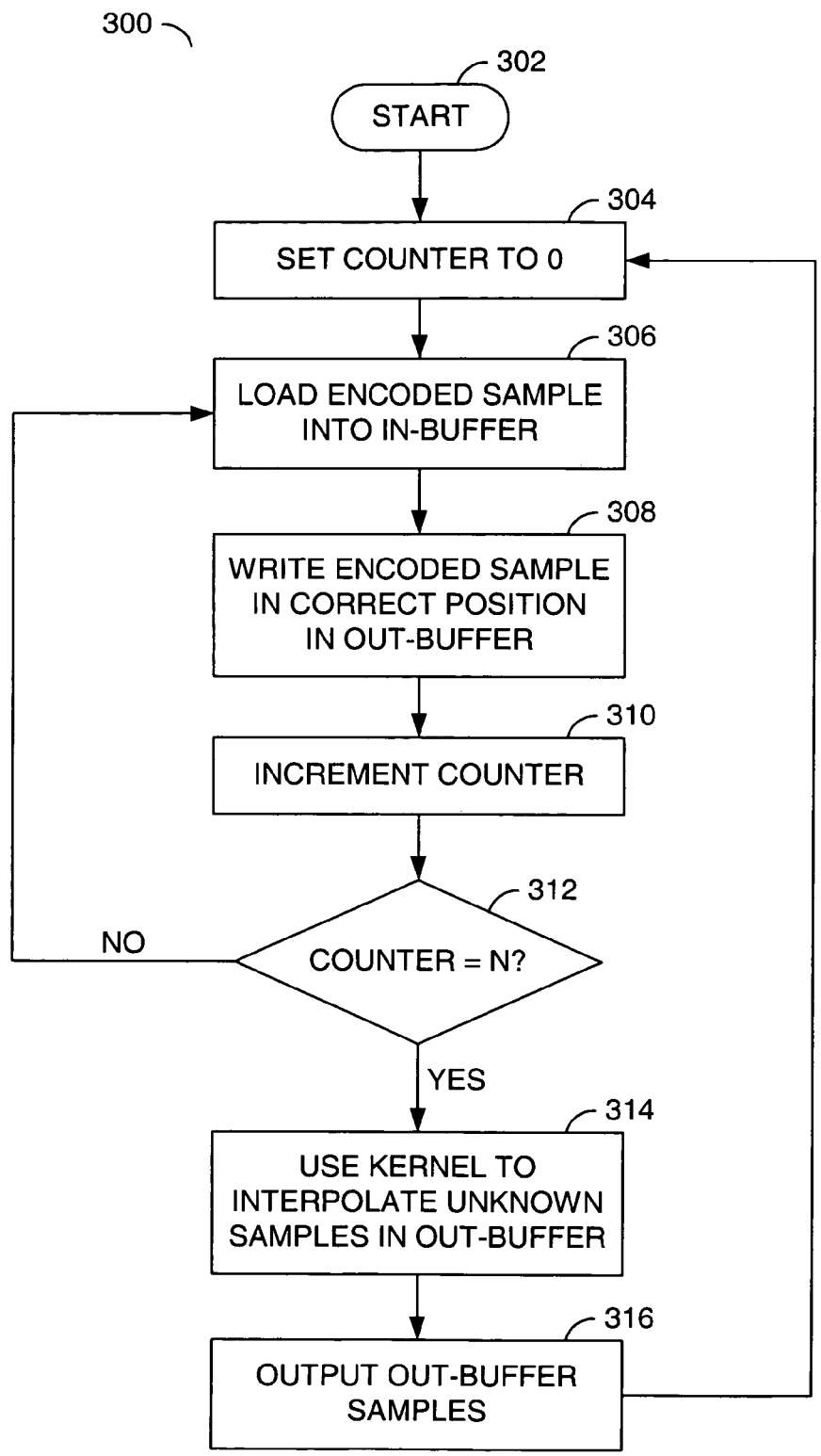
FIG. 6 is a flow diagram illustrating a kernel in accordance with the present invention.

Referring to FIG. 6, a method 300 is shown implementing the kernel. The method 300 generally comprises a state 302, a state (or step) 304, a state (or step) 306, a state (or step) 308, a state (or step) 310, a decision state 312, a state (or step) 314 and a state (or step) 316. The state 302 generally starts the method 300. The state 304 generally sets the counter to zero. The state 306 generally loads an encoded sample into the in-buffer. The state 308 generally writes an encoded sample in a correct position in the out-buffer 170. The state 310 generally increments the counter. The state 312 determines whether the counter is equal to N. If so, the method 300 moves to the state 314, if not, the method 300 moves back to the state 306. The state 314 generally uses the kernel to interpolate unknown samples in the out-buffer 170. The state 316 generally presents the out-buffer samples. The out-buffer samples are generally output to the array 172. The out-buffer samples generally comprise the data samples on the signal ENCODED_STREAM and the missing data samples.

The function performed by the diagrams of FIG. 5 and FIG. 6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disc including floppy disc, optical disc, CD-ROM, magneto-optical discs, ROMs, RAMs, EPROMs, EEPROMs, flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for implementing a flexible sampling-rate encoder, comprising the steps of:
   (A) sampling an input signal at a regular time-interval to produce sampled data;
   (B) generating a pseudo-random bit sequence having a plurality of bits, wherein each bit corresponds to a different sampling time;
   (C) encoding a first set of said sampled data to generate an encoded stream when any bit in said pseudo-random bit sequence is equal to a first value and rejecting a second set of said sampled data when any bit in said pseudo-random bit sequence is equal to a second value, wherein each bit in said encoded stream corresponds to one of sampling times defined in step (B);
   (D) determining said different sampling time for each sample in said encoded stream; and
   (E) aligning said encoded stream with said pseudo-random bit sequence to determine said different sampling time for each sample in said encoded stream.

2. The method according to claim 1, wherein step (C) further comprises the step of:
   interpolating said encoded stream to recover said second set of said sampled data.

3. The method according to claim 2, further comprising the step of:
   reconstructing said input signal to include said first set of sampled data and said second set of sampled data in response to interpolating said encoded stream.

4. The method according to claim 1, further comprising the step of:
   generating an intermediate signal in response to a control signal.

5. The method according to claim 4, further comprising the step of:
   inserting don't care values in said intermediate signal to correspond to the rejected said second set of sampled data.

6. The method according to claim 1, further comprising the step of:
   communicating said pseudo-random bit sequence to an encoder and a decoder.

7. The method according to claim 1, wherein step (B) further comprises the step of:
   adjusting said different sampling times based on the number of ones or zeros generated by a pseudo-random bit sequence generator.

8. The method according to claim 2, further comprising the step of:
   interpolating said encoded stream through linear predictive coding or neural networks.

9. The method according to claim 1, wherein step (B) further comprises the step of:
   selecting said first set of sampled data to be encoded randomly based on said first value of said bits of said pseudo-random bit sequence.

10. The method according to claim 1, further comprising the step of:
    recovering high frequency information from said encoded stream.

11. The method according to claim 1, further comprising the step of:
    adjusting said sampling time in response to a measure of the complexity of said input signal.

12. An apparatus comprising:
    means for sampling an input signal at a regular time-interval to produce sampled data;
    means for generating a pseudo-random bit sequence having a plurality of bits, wherein each bit corresponds to a different sampling time;
    means for encoding a first set of said sampled data to generate an encoded stream when any bit in said pseudo-random bit sequence is equal to a first value and rejecting a second set of said sampled data when any bit in said pseudo-random bit sequence is equal to a second value, wherein each bit in said encoded stream corresponds to one of said different sampling times;
    means for determining said different sampling times for each sample in said encoded stream; and
    means for aligning said encoded stream with said pseudo-random bit sequence to determine said different sampling time for each sample in said encoded stream.

13. An apparatus comprising:
    a sampler circuit configured to (i) sample an input signal and (ii) produce sampled data;
    a pseudo-random bit sequence generator configured to generate a pseudo-random bit sequence having a plurality of bits, wherein each bit corresponds to a different sampling time;
    an encoder configured to (i) encode a first set of said sampled data and (ii) generate an encoded stream when any bit in said pseudo-random bit sequence is equal to a first value and rejecting a second set of said sampled data when any bit in said pseudo-random bit sequence is equal to a second value, wherein each bit in said encoded stream corresponds to said different sampling time;
    a decoder configured to determine said different sampling time for each sample in said encoded stream, wherein said decoder further comprises a sample alignment circuit configured to (i) align each bit on said encoded stream with each bit in said pseudo-random bit sequence and (ii) determine said different sampling time for each sample of said encoded stream; and
    a multiplexer configured to (i) produce said first set of sampled data in response to any of said bits of said pseudo-random bit sequence equaling said first value and (ii) reject a second set of sampled data in response to any of said bits of said pseudo-random sequence equaling a second value.

14. The apparatus according to claim 13, wherein said decoder further comprises:
    an interpolator circuit configured to interpolate said second set of sampled data.

15. The apparatus according to claim 13, wherein said sampling time is adjusted in response to a complexity of said input signal.

* * * * *